May 30, 1939.  C. L. EKSERGIAN ET AL  2,160,414
TIRE-VALVE CHUCK
Filed April 9, 1937
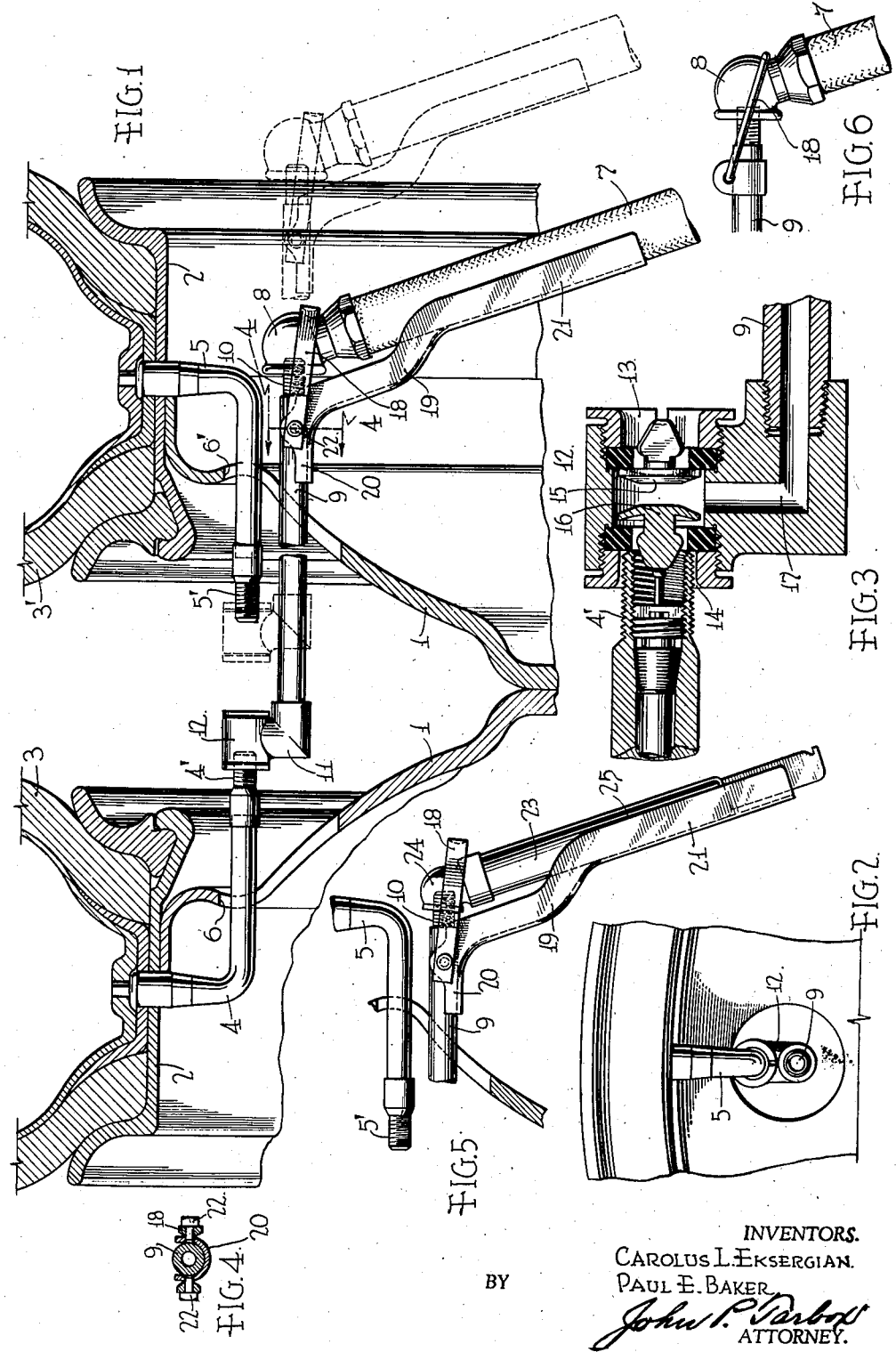
INVENTORS.
CAROLUS L. EKSERGIAN.
PAUL E. BAKER
BY John P. Tarbox
ATTORNEY.

Patented May 30, 1939

2,160,414

UNITED STATES PATENT OFFICE 2,160,414

TIRE-VALVE CHUCK

Carolus L. Eksergian and Paul E. Baker, Detroit, Mich., assignors to Budd Wheel Company, Philadelphia, Pa., a corporation of Pennsylvania Application April 9, 1937, Serial No. 135,941

2 Claims. (Cl. 284—17)

This invention relates to a chuck assembly attachment for the usual inflating hose employed for inflating pneumatic tires, or for the standard tire gauge used for measuring the air pressure of pneumatic tires.

On the common type of disc wheels the hand holes are made large enough to reach through with the ordinary type of chuck and inflate the inner dual tire and also the outer dual tire. The disc is somewhat weakened because of the necessity of making the hand hole large enough to reach through in order to inflate the dual tires. Furthermore, there has been considerable objection to this disc wheel with the necessarily large hand holes, because it does not lend itself to decorative effect and striping.

The important object of this invention is to provide an inflation chuck assembly attachment with which it is very easy to reach both valves of the tires on dual disc wheels.

With the use of this invention, it is only necessary to put one very small hole in each disc, thereby avoiding any weakening of the disc, and furthermore the disc will lend itself readily to decorative effect and striping.

Other objects and advantages of this invention will become apparent during the course of the following description, taken in connection with the accompanying drawing, wherein is illustrated a practical embodiment of the invention, and in which:

Figure 1 is a transverse section of dual disc wheels having dual tires mounted thereon, showing a practical embodiment of the invention as operatively applied to the valve stems of the tires;

Figure 2 is a fragmentary elevation of the device as applied to a valve stem;

Figure 3 is an enlarged longitudinal section through the chuck head as applied to a valve stem;

Figure 4 is a view taken on the line 4—4 of Figure 1;

Figure 5 is a partial view showing the application of the invention to an air pressure gauge; and Figure 6 is a partial view in side elevation showing a slight modification in which the handle is dispensed with.

Referring now to the drawing, and particularly to Figure 1, the numeral 1 designates dual disc wheels having rims 2 mounted thereon and tires 3 and 3' mounted on said rims, the valve sleeves 4 and 5 extending through radial openings in said rims beyond the inner peripheral wall of the latter and at this point they are bent at right angles, the ends 4' and 5' of said valve sleeves 4 and 5 extending toward each other through small openings 6 and 6' in the dual disc wheels 1.

As shown in Figure 1, the pipe or hose 7 which leads from the pump or source of air supply is provided with a chuck or connector 8 which is preferably the same as those ordinarily used for making a connection from the hose to the tire valve.

In carrying out the invention, we provide a hollow stem 9 having a reduced end 10 which is adapted to removably enter the opening in the chuck or connector 8 on the free end of air hose 7. Secured to the opposite end of stem 9 is a T-shaped chuck head 11 having openings 13 and 14 at the free ends of the longitudinal portion 12 of the chuck head 11 to receive the ends of valve sleeves 4' and 5'. These openings communicate with the hollow stem 9 through channel 17 and are controlled by double check valves 15 and 16. These valves are held in the closed position by the inside air pressure until sufficient force, for instance a valve stem, is inserted in either one of the openings 13 or 14 to overcome the inside air pressure, thereby opening that particular valve, the other valve remaining closed during this operation by reason of the inside air pressure. It will be understood that any other practical type of valve may be used here.

A handle 19 of general L-shape, as seen in Figures 1 and 5, has a U-shaped cross section, as seen in Figure 4, and leg 20 of this handle is secured near the end 10 of the stem 9 diametrically opposite the chuck head 11. The other leg 21 of handle 19 acts as a cradle for the hose 7 and thereby affords an ideal grip for manipulating as a unit the inflation chuck assembly and the free end of the hose.

A U-shaped clip member 18 is pivoted at its open end to the leg 20 of the handle 19 by means of screws or the like 22 and adapted for pivotal movement whereby the closed end of the clip 18 cooperates with the chuck head 8 to embrace the same, thus maintaining proper engagement of the stem 9 with the chuck head 8.

Figure 5 shows the chuck valve assembly as used with an air pressure gauge 23 of the standard type for testing the tire pressure. This pressure gauge 23 has a chuck head 24 in which the end 10 of the stem 9 is inserted and held in engagement with said chuck head 24 by the pivotal clip 18. In this instance the leg portion 21 acts as a cradle for the barrel 25 of the gauge, thereby affording a handy grip for manipulating as a unit the chuck valve assembly and air pressure gauge.

In the modification in Figure 6 the handle is dispensed with, the engagement of the clip 18 behind the rounded chuck head 8 being relied on to hold the parts in assembled relation. It will be understood that this clip springs over the head 8 drawing it toward the end of the stem 9 and snaps behind the head to hold the parts in this region.

The operation of this device is as follows. For inflating the tires of a dual disc wheel the service attendant grasps the ordinary air hose 7 which has a chuck head 8 on its free end, and inserts the end 10 of stem 9. The pivotal clip then is rotated until it embraces the chuck head 8, thereby holding the end of the stem in engagement with the chuck head. The device now being properly assembled with the air hose, the attendant grasps the leg portion 21 of the handle 19 and that portion of the hose 7 which rests in the leg portion 21, or if the modification of Figure 6 is used, the hose itself, which serves as a handle. The chuck head 11, secured to the opposite end of stem 9, is extended through the small opening 6' in the disc wheel until the valve sleeve 4' enters the opening 14 of the longitudinal section 12 of the chuck head 11 thereby opening the valve 16 and admitting air under pressure to the tire 3. It will be noted that the valve 15 at the other end of the longitudinal portion 12 remains closed during this operation.

Sufficient air having been admitted to the tire 3 the device is then moved to the dotted line position shown in Figure 1 until the sleeve 5' enters the opening 13, thereby opening the valve 15 and admitting air under pressure to tire 3'. This operation having been completed, the device is removed from the air hose 7 by rotating the clip 18 until it releases the chuck head 8, thereby allowing the end 10 of the stem to be removed from the chuck head 8.

To test the air pressure in each tire, the air pressure gauge 23 is assembled with the device in the same manner as that described above.

Thus it will be seen that with this new valve chuck it is very easy to reach both valve sleeves for inflating tires on dual disc wheels and it is only necessary to put one small hole in each disc to accommodate this device.

While we have shown the preferred embodiment of our invention, it is to be understood that various changes in the size, shape and arrangement of parts may be resorted to without departing from the spirit of the invention and the scope of the appended claims.

What we claim is:

1. An inflation chuck assembly attachment comprising a hollow stem, said stem constructed at one end thereof to be detachably inserted in the usual valve head carried on the free end of an inflating hose or standard tire gauge, means for maintaining proper engagement of the end of said stem with said valve head, an elongated handle secured to said stem and arranged to receive said inflation hose or tire gauge therealong, whereby the hose or tire gauge and handle together may be conveniently grasped by the hand of the operator, a plural outlet chuck head secured to the opposite end of said stem, said chuck head having opposed openings in its faces to receive the ends of pneumatic tire valve sleeves.

2. An inflation chuck assembly attachment comprising a hollow stem, said stem constructed at one end thereof for insertion in the usual valve head carried on the free end of an inflating hose or standard tire gauge, an elongated handle secured to said stem and acting as a cradle to embrace, for the greater portion of the length of said handle, said inflating hose or tire gauge, means for maintaining proper engagement of the end of said stem with said valve head, said means comprising a U-shaped clip pivotally mounted at its open end near the end of said stem and having its closed end constructed to embrace said valve head, a T-shaped outlet chuck head secured to the opposite end of said stem diametrically opposite said handle and extending perpendicular to said stem, the longitudinal portion of said T-shaped chuck head extending on a line parallel to said hollow stem, said longitudinal portion having opposed openings in its faces, said openings having check valves therein and constructed to receive the ends of pneumatic tire valve sleeves.

CAROLUS L. EKSERGIAN.
PAUL E. BAKER.